United States Patent
Lehn et al.

(10) Patent No.: US 10,776,632 B2
(45) Date of Patent: Sep. 15, 2020

(54) METHOD AND SYSTEM FOR DETECTING A FREE AREA INSIDE A PARKING LOT

(71) Applicant: Robert Bosch GmbH, Stuttgart (DE)

(72) Inventors: Andreas Lehn, Ludwigsburg (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 16/033,286

(22) Filed: Jul. 12, 2018

(65) Prior Publication Data

US 2019/0026566 A1    Jan. 24, 2019

(30) Foreign Application Priority Data

Jul. 19, 2017 (DE) .......................... 10 2017 212 379

(51) Int. Cl.
| | |
|---|---|
| *G06K 9/00* | (2006.01) |
| *H04N 13/189* | (2018.01) |
| *H04N 13/204* | (2018.01) |
| *H04N 13/239* | (2018.01) |
| *H04N 5/77* | (2006.01) |

(52) U.S. Cl.
CPC ...... *G06K 9/00785* (2013.01); *G06K 9/00711* (2013.01); *H04N 13/189* (2018.05); *H04N 13/204* (2018.05); *H04N 5/77* (2013.01); *H04N 13/239* (2018.05)

(58) Field of Classification Search
CPC ........... G06K 9/00785; G06K 9/00711; G06K 9/00771; G06K 9/00791; G06K 9/00812; G06T 2207/30232; G06T 2207/30236; G06T 2207/30241; G06T 2207/30264; G06T 2207/10016; G06T 7/70; G06T 7/292; H04N 13/189; H04N 13/204; H04N 13/239; H04N 5/77; H04N 5/247; B60W 30/06; G08G 1/14; G08G 1/146; G08G 1/164; G08G 1/04; G08G 1/065; G08G 1/017; G08G 1/0175; G08G 1/149; G08G 1/145; E04H 6/422; G05D 1/0212; G05D 1/0289; G05D 2201/0213; B62D 15/0285; B62D 15/027

See application file for complete search history.

(56) References Cited

U.S. PATENT DOCUMENTS

| | | | |
|---|---|---|---|
| 6,107,942 A | 8/2000 | Yoo et al. | |
| 10,582,163 B2 * | 3/2020 | Hodge | ............... H04N 21/2347 |
| 2005/0002544 A1 * | 1/2005 | Winter | ..................... G08G 1/14 |
| | | | 382/104 |

(Continued)

FOREIGN PATENT DOCUMENTS

DE    102015201209 A1    7/2016

*Primary Examiner* — Jose L Couso
(74) *Attorney, Agent, or Firm* — Norton Rose Fulbright US LLP; Gerard Messina

(57) ABSTRACT

For detecting a free area located inside a parking lot using at least one video camera, in particular a stereo-video camera, which is fixedly installed inside the parking lot, the visual range of the video camera including a section of the floor of the parking lot, a method includes: recording a camera image and/or an image sequence of camera images of at least a section of the floor of the parking lot using the video camera; comparing the camera images to a reference in order to identify a change in the section of the floor of the parking lot; and detecting a free area if no change is identified.

20 Claims, 3 Drawing Sheets

(56) References Cited

U.S. PATENT DOCUMENTS

| | | | | |
|---|---|---|---|---|
| 2008/0101656 A1* | 5/2008 | Barnes | ................... | G08G 1/017 |
| | | | | 382/104 |
| 2010/0309024 A1* | 12/2010 | Mimeault | .......... | G06K 9/00771 |
| | | | | 340/932.2 |
| 2015/0043771 A1* | 2/2015 | Wu | .................... | G06K 9/00711 |
| | | | | 382/103 |
| 2015/0138001 A1* | 5/2015 | Davies | ................... | G08G 1/017 |
| | | | | 340/932.2 |
| 2016/0098929 A1* | 4/2016 | Nakhjavani | ............ | G08G 1/144 |
| | | | | 340/932.2 |
| 2017/0069093 A1* | 3/2017 | Rexilius | .................... | G06T 7/20 |
| 2017/0285654 A1* | 10/2017 | Nagai | ................... | B60W 30/06 |
| 2017/0351267 A1* | 12/2017 | Mielenz | ............... | B60W 30/06 |
| 2018/0239968 A1* | 8/2018 | Gupta | ................ | G06K 9/00637 |
| 2020/0134332 A1* | 4/2020 | Vossoughi | ............. | G08G 1/015 |

\* cited by examiner

METHOD AND SYSTEM FOR DETECTING A FREE AREA INSIDE A PARKING LOT

CROSS-REFERENCE TO RELATED APPLICATIONS

The present application claims priority under 35 U.S.C. § 119 to DE 10 2017 212 379.6, filed in the Federal Republic of Germany on Jul. 19, 2017, the content of which is hereby incorporated by reference herein in its entirety.

FIELD OF THE INVENTION

The present invention relates to a system and method for detecting a free area inside a parking lot, e.g., a parking garage, and especially a free area inside a driving path of a parking lot, and to a corresponding parking lot and computer program.

BACKGROUND

The published application DE 10 2015 201 209 A1 shows a valet-parking system for the automatic transfer of a vehicle from a drop-off zone to an assigned parking position inside a predefined parking space. The known system includes a parking-lot monitoring system having at least one stationary sensor unit. The parking-lot monitoring system is developed to localize the vehicles driving inside the predefined parking space.

In addition, driver-assistance systems and systems for highly automated (autonomous) driving are known from the related art. Such systems, for instance, can use one or more sensor(s), which measure(s) and/or analyze(s) a three-dimensional space. The goal is the identification of any objects and obstacles. In addition, the dimensions (height, width, depth) of the detected objects must be ascertained with high reliability or accuracy. For instance, high accuracy is required if trajectories for passing the object have to be ascertained. The basis or the condition for these calculations are frequently numerous measuring points on the objects at different heights. A further general requirement is that the systems do not know the environment because it is not possible to travel the entire world in advance. This has the result that driver-assistance systems usually require an image of the 3D space in order to make decisions. This is necessary especially when the systems act in a highly automated or autonomous manner.

SUMMARY

An object on which the present invention is based is to provide a concept for the efficient detection of a free space inside a parking lot such as a parking garage, and in particular a free area inside a driving path of a parking lot.

According to an example embodiment of the present invention, a method is provided for detecting a free area located inside a parking lot using at least one video camera fixedly installed inside the parking lot, in particular a stereo-video camera, the visual range of the video camera including a section of the floor of the parking lot, where the method includes: recording a camera image and/or an image sequence of camera images of at least a section of the floor of the parking lot with the aid of the video camera; comparing the camera images to a reference in order to identify a change in the section of the floor of the parking lot; and detecting the section as a free area if no change is identified.

According to an example embodiment of the present invention, a system is provided for detecting a free area located inside a parking lot, the system including: at least one video camera fixedly installed inside the parking lot, in particular a stereo-video camera whose visual range includes at least a section of the floor of the parking lot, and which is developed to record camera images of the section of the floor of the parking lot; and a processor configured to compare the recorded camera images with a reference in order to identify a change in the section of the floor of the parking lot, and to detecting the section as a free area if no change is identified.

According to an example embodiment of the present invention, a parking lot is provided, which encompasses the system for detecting a free area located inside a parking lot.

According to an example embodiment of the present invention, a computer program is provided, which includes program code for executing the method for detecting a free area located inside a parking lot when the computer program is executed on a computer.

The present invention is based on the recognition that the above objective is able to be achieved in that at least one video camera is installed inside the parking lot, which is able to see, i.e., detect, a section of the floor of the parking lot, and changes occurring on the floor are able to be detected by comparing the recorded images, e.g., with a reference image or with an image of the same image sequence at a preceding point in time, thereby making it possible to detect objects, or if no changes are detected on the floor, to detect the recorded section as a free area.

A free area within the sense of the present invention is an area inside the parking lot in which a vehicle is safely able to drive under normal conditions.

Preferably, a detection of an object can take place when a change is identified. An object within the meaning of the present invention is any item that is temporarily located inside the parking lot, in particular inside a driving path of a vehicle, and that at least potentially constitutes a collision risk to a vehicle that is moving inside the parking lot. An object, for example, can be another vehicle, a person, an animal, or a thing. More specifically, an object is present in the parking lot only temporarily. Not to be counted as objects within the meaning of the present invention are stationary structures of the parking lot, e.g., walls, columns, masonry, etc.

Accordingly, a free area in particular is an area of the floor of the parking lot in which no object is situated.

A reference image that was recorded by the same video camera or by a camera in the same recording position is preferably used as a reference image for the comparison. This has the advantage that the current image and the reference image have the same perspective and thus no image correction or only a minor image correction is required prior to the comparison.

For instance, the comparison can be carried out by forming a difference.

In an example embodiment of the present invention, the comparison can be carried out using a reference image, the reference image having been recorded at an earlier point in time under defined conditions and using the same video camera, for instance. The reference image can be stored in a memory unit provided for this purpose. It can be provided, for instance, that different reference images are stored as a function of the season and/or the time of day, for example, and a reference image that is adapted to the current season and/or the current time of day, for example, is selected for the comparison. This particularly achieves the technical advantage that changes due to variations in the light conditions, for instance, that are caused by the time of day or by the season are able to be taken into account by the adapted reference image.

In an alternative example embodiment of the present invention, the comparison can be carried out using a temporally preceding image of the same image sequence, e.g., using the image recorded immediately before. It is also conceivable to average a plurality of sequential images of an image sequence and to use the averaged image as the reference image.

In an example embodiment of the present invention, it is also possible to use as the reference a reference-image sequence or a reference-video sequence instead of a single reference image. In this example embodiment, an individual camera image and/or a currently recorded video sequence can be compared with the reference-image sequence. For instance, this provides the technical advantage that fleeting events that lead to a change on the floor of the parking lot in a single camera image or in a few camera images, such as a rapidly moving object that merely crosses the particular section of the floor of the parking lot and does not constitute an obstacle, need not necessarily cause a section to be detected as an occupied area.

If the current image or the current image sequence and the reference image and/or the reference-image sequence exhibit no changes, i.e., are equivalent or identical, or if they exhibit differences that do not exceed a maximum predefined tolerance value, then it can be assumed that no object is located in the section of the floor of the parking lot, or in other words, that the section is unoccupied. However, if an object is situated in this section of the floor of the parking lot, the current image will differ from the reference image by a difference that is greater than the predefined tolerance value.

The respective wordings "change" or "difference" or "differences in the image information" or "differences in the camera images" within the meaning of this description in particular also encompass the case that the image information or the camera images differ(s) by at least a predefined tolerance value from a reference or a reference image or a reference-image sequence, respectively. Only differences or changes that exceed the predefined tolerance value result in the detection of a change, and thus in a detection of an object. As a result, this particularly means that slight differences in the brightness and/or in the color information can lead to the statement that the respective image information or camera images are equivalent or identical as long as the differences are smaller than the predefined tolerance value.

This consequently means, for example, that a free area is detected only if the camera images differ from the reference image(s) by a difference that is smaller than the predefined tolerance value, for example. A tolerance value can also mean that a certain minimum number of pixels differs from the reference by at least a predefined brightness value and/or color value.

Therefore, this offers the technical advantage that a concept for the efficient identification of a change in the current camera image is able to be provided.

In a preferred example embodiment of the present invention, the video camera is developed as a stereo-video camera. The recorded images thus include three-dimensional information about the visual range of the camera.

It can now particularly be provided that the reference also includes three-dimensional information about the visual range of the camera. This three-dimensional information can be taken into account in the comparison. For instance, when a change is detected, it is possible to determine whether the changed image region represents a certain minimum extension perpendicular to the floor plane, or in other words, whether it represents an elevated object.

This provides the particular technical advantage that two-dimensional objects such as shadows or changes in color will not be detected as objects and the detected section will not be unintentionally detected as an occupied area.

Alternatively or additionally, it can be provided that the three-dimensional information especially is evaluated only if a change attributable to an object was already detected, so that this object can be examined more closely. For instance, an area of the image in which a change with regard to the reference image was detected can be examined with regard to its three-dimensional properties.

In particular the extension of the object is able to be determined in this manner and an object classification be carried out.

The detected object can particularly be classified as crossable or non-crossable by a motor vehicle. More specifically, a detected object can be classified as crossable when it does not exceed an example height, e.g., a height of 10 cm. Alternatively or additionally, structural features such as the extension of the object in the x- and/or the y-direction, the x- and the y-directions defining the floor plane, and/or the color and/or the pattern of the object can be used for the classification. In the event that the object is classified as crossable, the area can be detected as a free area, for instance.

Thus, this offers the technical advantage that information is able to be provided as to whether a vehicle is able to drive over an object detected in an area without risk to the vehicle and/or to the object, i.e., the region is unoccupied, or whether it is not possible to drive over a detected object, and the area is consequently occupied.

On the basis of the object classification, it is possible to derive a recommendation for action for vehicles that move inside the parking lot. This recommendation, for instance, can be transmitted to the vehicles.

A parking lot within the meaning of the present invention in particular is a parking lot for motor vehicles. The parking lot, for example, is a parking building or a parking garage. An object to be detected is located inside a driving corridor of the parking lot, for instance.

An object in particular denotes an object whose height amounts to at least 10 cm relative to a floor of the parking lot.

An object is located on a floor of the parking lot, e.g., on a driving surface or inside a driving area, i.e., inside a driving path of the parking lot, for instance.

According to an example embodiment, it is provided that at least n video cameras are used, n being greater than or equal to 2, and that the video cameras jointly cover an area of the parking lot in which vehicles are usually moving during parking and/or unparking operations. This area can also be referred to as an operating region of the parking lot. The sections of the floor of the parking lot that are able to be recorded by the respective video cameras can overlap one another.

For example, this provides a technical advantage that the operating region is able to be monitored in an efficient manner.

According to an example embodiment, it is provided that the system for detecting a free area located inside a parking lot is designed or developed to carry out or execute the method for detecting a free area located inside a parking lot.

According to an example embodiment, it is provided that the parking lot is set up or developed to carry out or implement the method for detecting a free area located inside a parking lot on the floor of the parking lot.

Technical functionalities of the system analogously result from corresponding technical functionalities of the method, and vice versa.

Therefore, this particularly means that the system features result from corresponding method features, and vice versa.

According to an example embodiment, at least two video cameras are provided either in order to detect multiple sections of the parking lot and/or to detect a section with the aid of multiple video cameras in order to increase the reliability of the system.

According to an example embodiment, it is provided that the processor is developed to detect a free area when it is ascertained on the basis of the comparison that a current camera image differs from a reference by less than a predefined tolerance value, in particular.

The wording 'respectively' especially includes the wording 'and/or'.

According to an example embodiment, it is provided that a respective video camera and/or multiple and/or all video cameras is/are disposed at a height of at least 2 m, in particular 2.5 m, relative to a floor of the parking lot.

For example, this provides a technical advantage that the floor of the parking lot is able to be recorded in an efficient manner.

In an example embodiment, it is provided that a respective video camera, and/or multiple and/or all video cameras is/are disposed on a ceiling of the parking lot.

For instance, this provides a technical advantage that the positioning of the video cameras is able to be accomplished in a particularly space-saving manner.

In an advantageous manner, the concept according to the present invention can be used in what is known as AVP systems. 'AVP' stands for 'Automated Valet Parking' and can be translated as an 'automated parking operation'. Within the framework of such an AVP system, it is particularly provided that motor vehicles are automatically parked inside a parking lot and are automatically guided from their parking position to a pick-up position at the end of a parking period, where the motor vehicle is able to be picked up by its owner. Using the present invention, it can be provided in such systems that a central infrastructure (e.g., a server) sends current information pertaining to free areas and/or detected objects to the vehicles that are moving inside the parking lot, in particular when an object is located inside a provided driving corridor of the respective vehicle. The respective vehicle can then be stopped, e.g., until the object has disappeared again. Alternatively or additionally, it is also possible to calculate an alternative route and/or an evasive maneuver for the vehicle that, for instance, no longer leads across the floor section of the parking lot in which the object was detected, i.e., the area that was detected as occupied.

In the following text the present invention will be described in greater detail with the aid of preferred specific embodiments.

DETAILED DESCRIPTION

Figure 1:
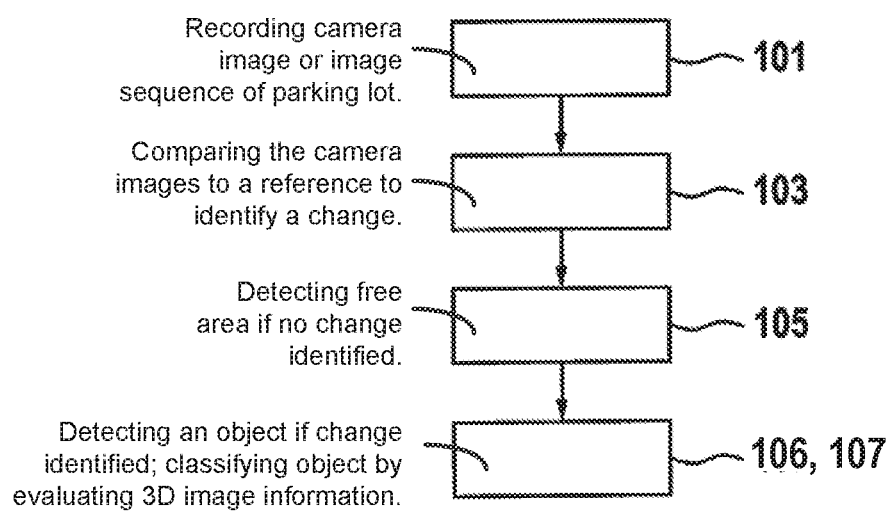
FIG. 1 is a flowchart that illustrates a method for detecting a free area located inside a parking lot, according to an example embodiment of the present invention.

In the following description of the exemplary embodiments of the present invention, identical elements are denoted by identical reference numerals, and a repeated description of these elements is omitted, as the case can be. The figures illustrate the subject matter of the present invention merely schematically.

FIG. 1 shows a method for detecting a free space located inside a parking lot using at least one video camera that is fixedly installed inside the parking lot, the visual range of the video camera including at least a section of the floor of the parking lot.

The method includes: recording 101 a camera image and/or an image sequence of camera images of the section of the floor of the parking lot with the aid of the video camera; comparing 103 the camera images to a reference in order to identify a change in the section of the floor of the parking lot; detecting 105 a free area if no change is identified; optionally detecting 106 an object if a change is identified; and optionally classifying 107 the elevated object by evaluating three-dimensional image information.

The information that a free area or an object is detected can be handed over to a higher-level closed-loop control system, for instance. In the event that an object was detected, this closed-loop control system is able to stop a remotely-controlled vehicle, for example, or send a stop signal to an autonomously traveling motor vehicle if an object was detected inside the parking lot that is located in a section of the floor of the parking lot that lies inside a driving corridor of the vehicle. This ensures that these motor vehicles are still able to stop in front of the object in a timely manner. The closed-loop control system is encompassed by a parking-lot management system, for example.

As a result, the concept according to the present invention can advantageously be used also in what is commonly known as AVP systems. In comparison with a conventional driver assistance and the methods for object detection used in conventional driver-assistance systems, the concept according to the present invention in particular offers the advantage that the sensors (video cameras) provided for the object detection are statically or fixedly installed inside the parking lot, e.g., on walls or columns. As a result, the visual field, i.e., the environment that the sensor is focused on, is known, especially in the case that no object is present. For instance, the driving surface is known with regard to color, state (holes, uneven surface, etc.), and patterns (lines, edges, markings). All that must therefore be ascertained is whether the area that the vehicle is to enter is free, or in other words, does not include an object. Since an AVP vehicle does not necessarily have to execute an evasive maneuver due to the normally predefined operational region in the case of AVP systems, and stopping of the vehicle is usually sufficient, it is not mandatory to ascertain dimensions, velocities, etc. of the detected object. It is sufficient to detect the presence of an object because, for example, the velocities of AVP vehicles inside the parking lot are normally very much lower (e.g., less than 10 km/h) than in road traffic (e.g., up to over 200 km/h).

Figure 2:
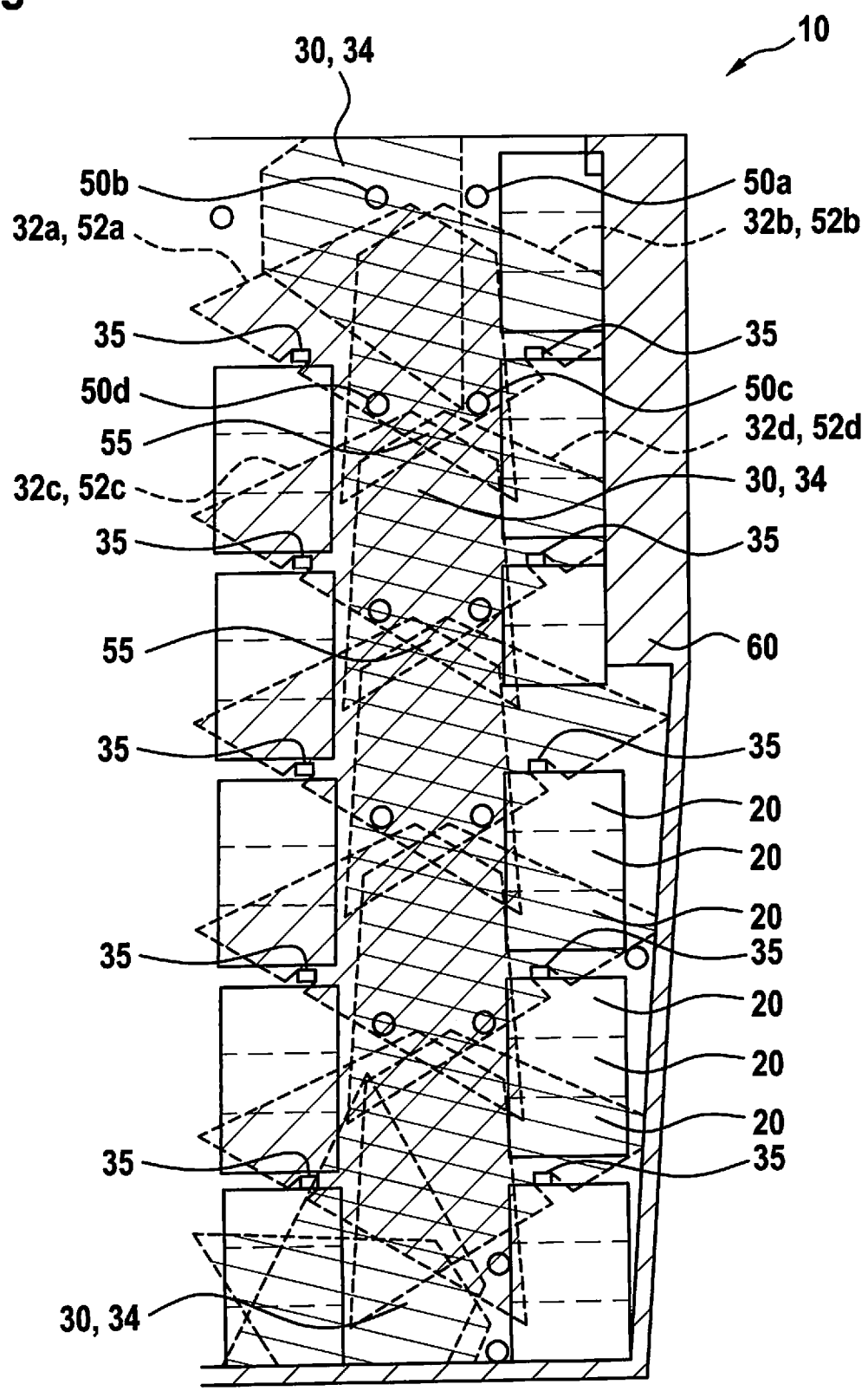
FIG. 2 is a schematic view of a parking lot having a plurality of video cameras for detecting free areas that are located inside the parking lot on the floor of the parking lot, according to an example embodiment of the present invention.

The use of a system and/or a method according to the present invention in an AVP system requires the use of a plurality of stationary sensors (video cameras) in order to monitor the entire parking space, if at all possible. For instance, FIG. 2 exemplarily shows a section of a parking lot 10 that is part of an AVP system. Parking lot 10 has different parking positions 20 for AVP vehicles. In addition, parking lot 10 has access routes 34, which represent floor 30 of the parking lot on which AVP vehicles are moving to or from their parking positions 20 in an autonomous or remotely-controlled manner, for example. Moreover, the parking lot has a plurality of stationary video cameras 50a, 50b, 50c, 50d as well as further stationary video cameras, which have not been provided with reference numerals for reasons of clarity. For example, the video cameras are disposed on the ceiling of parking lot 10 at a height of 2 to 2.5 m. Each video camera 50a, 50b, 50c, 50d has an example visual range 52a, 52b, 52c, 52d, which covers at least a section 32a, 32b, 32c, 32d of floor 30 of parking lot 10. Sections 32a, 32b, 32c, 32d of floor 30 of parking lot 10, which correspond to visual ranges 52a, 52b, 52c, 52d of video camera 50a, 50b, 50c, 50d, are developed in an approximately trapezoidal form in this particular example. Parking lot 10 has solid structures such as walls 60 and support columns 35, which restrict visual ranges 52a, 52b, 52c, 52d. In this particular example, two video cameras 50a, 50b and 50c, 50d, respectively, are disposed in pairs along access route 34 in each case. Visual ranges 52a and 52b or 52c and 52d of two video cameras of a respective pair 50a, 50b and 50c, 50d are aligned at an angle of approximately 90 degrees relative to each other. This results in overlap regions 55 of floor 30 of the parking lot that are detected by more than one video camera 50a, 50b or 50c, 50d.

For each one of floor sections 32 that lie in one of visual ranges 52a, 52b, 52c, 52d of video cameras 50a, 50b, 50c, 50d, it is now possible to detect free areas according to the present invention, that is to say, areas in which no object is located that could pose a danger to a vehicle moving inside parking lot 10.

Figure 3:
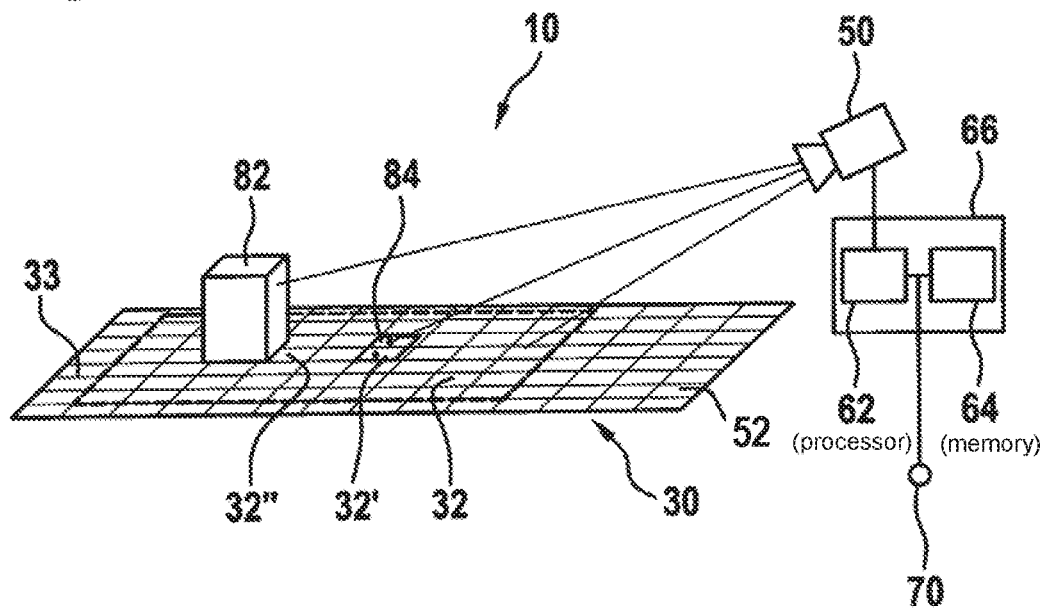
FIG. 3 illustrates a system for detecting free areas located inside a parking lot, according to an example embodiment of the present invention.

FIG. 3 schematically shows a system for detecting a free area located inside a parking lot 10 according to an example embodiment of the present invention. The system includes a positioning of a video camera 50 developed as a stereo-video camera, which is situated in a stationary manner in a position that is elevated in comparison with floor 30 of parking lot 10, e.g., at a height of 2.5 m. Video camera 50 detects a visual range 52, which includes at least a section 32 of floor 30 of parking lot 10. It is also possible that a plurality of subsections 32', 32'', 32''', etc. are located inside visual range 52, as illustrated in the figure by grid 33. A processor 62 compares the camera images recorded by video camera 50 to a reference in order to identify a change in section 32 of floor 30 of parking lot 10. In addition, processor 62 is developed to detect a free area 56 if no change is identified in comparison with the reference, or to detect an object if a change has been identified in comparison with the reference. In this particular example, the reference is retrieved from a memory 64 provided for this purpose. Processor 62 and memory 64 can be integrated into a unit 66.

The reference, for example, is a camera image or a camera-image sequence that had been recorded at an earlier point in time under defined conditions and that definitely did not include any objects that were located in section 32 of floor 30. In the illustrated situation, two possible objects 82 and 84 have been detected inside section 32 of floor 30 in that the processor has identified a change in comparison with the reference. For example, this information is able to be transmitted via an appropriately configured interface 70 to a vehicle moving inside parking lot 10, in particular an AVP vehicle, and/or to a parking-lot management system. In addition, the information about the particular subsection 32', 32'' or about the subsections in which objects 82 and 84 were detected can also be transmitted. Corresponding subsections 32', 32'' can then be detected as regions that are not free.

Object 82 involves an elevated object, e.g., a box. Object 84 is a small object such as a sheet of paper. Processor 62 can be developed to classify detected objects 82 and 84, especially as crossable or non-crossable, by evaluating the recorded camera images, in particular by evaluating three-dimensional information. The information about the classification of objects 82 and 84 is also able to be transmitted via interface 70. For example, after the evaluation of the three-dimensional information has indicated that object 84 is crossable, corresponding subsections 32' can be detected as free areas.

In the illustrated example, processor 62 and memory 64 are integrated into a control unit 66. Control unit 66 can be provided inside camera 50. Alternatively, processor 62 and/or memory 64 can be part of a unit that is provided separately from camera 50. For instance, processor 62 and/or memory 64 can be developed as part of a parking-lot management system. As an alternative, processor 62 and/or memory 64 can be developed as part of a Cloud computing system.

What is claimed is:

1. A method for detecting a free area located inside a parking lot using a video camera fixedly installed inside the parking lot, wherein a visual range of the video camera includes a section of a floor of the parking lot, the method comprising:
    recording a camera image or an image sequence of camera images of the section of the floor of the parking lot using the video camera;
    selecting, as a reference, one reference camera image from a plurality of reference camera images that were previously recorded using the video camera, wherein different ones of the reference camera images were recorded under different respective predefined conditions and the selecting is performed based on a current situation;
    comparing the recorded camera image or image sequence of camera images to the reference in order to identify whether there is a change in the section of the floor of the parking lot; and
    performing a detection by executing an algorithm that defines that the section is detected as being a free area responsive to a result of the comparison being that no change is identified.

2. The method of claim 1, wherein the algorithm further defines that an object is detected responsive to the result of the comparison being that a change is identified.

3. The method of claim 1, wherein the comparison is accomplished by forming a difference.

4. The method of claim 1, wherein the video camera is a stereo-video camera.

5. The method of claim 4, wherein the camera image or image sequence of camera images includes three-dimensional information about the visual range of the video camera.

6. The method of claim 5, wherein the performing of the detection includes evaluating the three-dimensional information, and, based on the evaluation, detecting at least one of whether the section of the floor of the parking lot is free and whether an object is present inside the section.

7. The method of claim 1, wherein the no change is detected when the recorded camera image or image sequence of camera images does not differ from the reference by more than a predefined tolerance value.

8. A system for detecting a free area inside a parking lot, the system comprising:
a video camera fixedly installed inside the parking lot, whose visual range includes a section of the floor of the parking lot, and which is configured to record camera images of the section of the floor of the parking lot; and
a processor, wherein the processor is configured to:
select, as a reference, one reference camera image from a plurality of reference camera images that were previously recorded using the video camera, wherein different ones of the reference camera images were recorded under different respective predefined conditions and the selecting is performed based on a current situation;
compare the recorded camera images to the reference in order to identify a change in the section of the floor of the parking lot; and
detect the section as a free area if no change is identified in the comparison.

9. The system of claim 8, wherein the processor is configured to detect an object if a change is identified in the comparison.

10. The system of claim 8, further comprising a memory device in which the reference is stored.

11. The system of claim 9, wherein the no change is detected when the recorded camera image or image sequence of camera images does not differ from the reference by more than a predefined tolerance value.

12. A parking lot comprising a system, the system comprising:
a video camera fixedly installed in the parking lot, whose visual range includes a section of the floor of the parking lot, and which is configured to record camera images of the section of the floor of the parking lot; and
a processor, wherein the processor is configured to:
select, as a reference, one reference camera image from a plurality of reference camera images that were previously recorded using the video camera, wherein different ones of the reference camera images were recorded under different respective predefined conditions and the selecting is performed based on a current situation;
compare the recorded camera images to the reference in order to identify a change in the section of the floor of the parking lot; and
detect the section as a free area if no change is identified in the comparison and otherwise detect an object in the parking lot.

13. The parking lot of claim 12, further comprising a parking-lot management system configured to operate an automatic valet-parking system and carry out an action responsive to the section not being detected as the free section, where the section is in a path of a vehicle moving in the parking lot.

14. The parking lot of claim 13, wherein the action includes at least one of:
the parking-lot management system sending a stop command to the vehicle;
calculating an alternative route on the basis of detected free sections, and sending information for traveling the alternative route to the vehicle; and
calculating an evasive maneuver and sending information for carrying out the evasive maneuver to the vehicle.

15. A non-transitory computer-readable medium on which are stored instructions that are executable by a processor and that, when executed by the processor, cause the processor to perform a method for detecting a free area located inside a parking lot using a video camera fixedly installed inside the parking lot, wherein a visual range of the video camera includes a section of a floor of the parking lot, the method comprising:
obtaining from the video camera a camera image or an image sequence of camera images of the section of the floor of the parking lot;
selecting, as a reference, one reference camera image from a plurality of reference camera images that were previously recorded using the video camera, wherein different ones of the reference camera images were recorded under different respective predefined conditions and the selecting is performed based on a current situation;
comparing the recorded camera image or image sequence of camera images to the reference in order to identify whether there is a change in the section of the floor of the parking lot; and
performing a detection by executing an algorithm that defines that the section is detected as being a free area responsive to a result of the comparison being that no change is identified.

16. The method of claim 1, wherein the different respective predefined conditions include at least one of: a time of day, or a season of the year.

17. The method of claim 16, wherein the current condition includes at least one of: a current time of day, or a current season of the year.

18. The method of claim 1, wherein the reference includes an image sequence.

19. The method of claim 1, wherein a change is identified when a predetermined number of pixels of the recorded camera image or image sequence of camera images differs from the reference by at least one of: a predetermined brightness value, or a predetermined color value.

20. The method of claim 1, wherein the performing the detection includes determining whether a detected object is crossable by a motor vehicle.

* * * * *